United States Patent
Kawabe et al.

(10) Patent No.: US 8,982,505 B2
(45) Date of Patent: Mar. 17, 2015

(54) METHOD FOR GENERATING ADDRESS DATA AND DISK STORAGE APPARATUS

(71) Applicant: Kabushiki Kaisha Toshiba, Tokyo (JP)

(72) Inventors: Takayuki Kawabe, Sagamihara (JP); Takeyori Hara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/072,028

(22) Filed: Nov. 5, 2013

(65) Prior Publication Data

US 2015/0043099 A1    Feb. 12, 2015

Related U.S. Application Data

(60) Provisional application No. 61/864,831, filed on Aug. 12, 2013.

(51) Int. Cl.
| | |
|---|---|
| *G11B 5/596* | (2006.01) |
| *G11B 5/09* | (2006.01) |
| *G11B 20/12* | (2006.01) |
| *G11B 20/10* | (2006.01) |

(52) U.S. Cl.
CPC .... *G11B 20/1252* (2013.01); *G11B 2020/1232* (2013.01); *G11B 2020/1281* (2013.01); *G11B 2020/10916* (2013.01)
USPC .......................................... 360/77.08; 360/48

(58) Field of Classification Search
CPC .......... G11B 5/59655; G11B 5/59688; G11B 5/59633; G11B 5/5547; G11B 27/083; G11B 2220/90; G11B 5/012; G11B 2220/20
USPC .............. 360/77.08, 78.14, 75, 77.02, 77.04, 360/78.04, 77.05; 260/48, 49, 77.08, 40, 260/77.02, 78.14, 77.04, 78.04, 77.05
See application file for complete search history.

(56) References Cited

U.S. PATENT DOCUMENTS

| | | | |
|---|---|---|---|
| 5,589,998 A | 12/1996 | Yu | |
| 5,666,238 A * | 9/1997 | Igari et al. | 360/77.08 |
| 5,903,404 A | 5/1999 | Tsurumi et al. | |
| 6,034,830 A | 3/2000 | Sasamoto | |
| 7,576,942 B1 * | 8/2009 | Karns et al. | 360/77.08 |

* cited by examiner

*Primary Examiner* — Nabil Hindi
(74) *Attorney, Agent, or Firm* — Knobbe Martens Olson & Bear LLP (57) ABSTRACT

According to one embodiment, there is provided a method for generating address data. The method generates a first code corresponding to a cylinder number. The cylinder number is divided and recorded on servo sectors in association with an identification of a cylinder on a disk. The first code is formed of some codes obtained by dividing the cylinder number based on a number of each of the servo sectors. The method generates a second code corresponding to address data for each of the servo sectors, by encoding the first code based on the servo sector number and a servo format number. The servo format number is used to identify a format of each of the servo sectors.

17 Claims, 11 Drawing Sheets

F I G. 1

F I G. 2A

F I G. 2B Normal format

F I G. 2C Short format

| Key index | 7 | 0 | 1 | 2 | 3 | 4 | 5 | 6 | 7 | 0 | 1 | 2 | 3 |
|---|---|---|---|---|---|---|---|---|---|---|---|---|---|
| Key No. | 12 | 0 | 1 | 2 | 3 | 8 | 14 | 13 | 12 | 0 | 1 | 2 | 3 |
| Key code | 1100 | 0000 | 0001 | 0010 | 0011 | 1000 | 1110 | 1101 | 1100 | 0000 | 0001 | 0010 | 0011 |
| SGC Format No. | 3 | 0 | 1 | 2 | 3 | 0 | 1 | 2 | 3 | 0 | 1 | 2 | 3 |

FIG. 5B

High-order 12-bit (bits 7 to 18) codes of cylinder numbers

| Decimal | Binary | | | Gray code | | | | | | | | | | | |
|---|---|---|---|---|---|---|---|---|---|---|---|---|---|---|---|
| 2040 | 011 | 111 | 000 | 010 | 100 | 100 | 000 | 1100 | 0010 | 0101 | 0110 | 0011 | 1010 | 1001 | 1100 | 0010 | 0101 | 0110 | 0011 |
| 2041 | 011 | 111 | 001 | 010 | 100 | 100 | 001 | 1101 | 0010 | 0101 | 0110 | 0010 | 1010 | 1001 | 1101 | 0010 | 0101 | 0110 | 0010 |
| 2042 | 011 | 111 | 010 | 010 | 100 | 100 | 011 | 1111 | 0010 | 0101 | 0110 | 0000 | 1010 | 1001 | 1111 | 0010 | 0101 | 0110 | 0000 |
| 2043 | 011 | 111 | 011 | 010 | 100 | 100 | 010 | 1110 | 0010 | 0101 | 0110 | 0001 | 1010 | 1001 | 1110 | 0010 | 0101 | 0110 | 0001 |
| 2044 | 011 | 111 | 100 | 010 | 100 | 100 | 110 | 1010 | 0010 | 0101 | 0110 | 0101 | 1010 | 1001 | 1010 | 0010 | 0101 | 0110 | 0101 |
| 2045 | 011 | 111 | 101 | 010 | 100 | 100 | 111 | 1011 | 0010 | 0101 | 0110 | 0100 | 1010 | 1001 | 1111 | 0010 | 0101 | 0110 | 0100 |
| 2046 | 011 | 111 | 110 | 010 | 100 | 100 | 101 | 1001 | 0010 | 0101 | 0110 | 0110 | 1010 | 1001 | 1001 | 0010 | 0101 | 0110 | 0110 |
| 2047 | 011 | 111 | 111 | 010 | 100 | 100 | 111 | 1000 | 0010 | 0101 | 0110 | 0111 | 1010 | 1001 | 1000 | 0010 | 0101 | 0110 | 0111 |

| Key index | 7 | 0 | 1 | 2 | 3 | 4 | 5 | 6 | 7 | 0 | 1 | 2 | 3 |
|---|---|---|---|---|---|---|---|---|---|---|---|---|---|
| Key No. | 12 | 0 | 1 | 2 | 3 | 8 | 14 | 13 | 12 | 0 | 1 | 2 | 3 |
| Key code | 1100 | 0000 | 0001 | 0010 | 0011 | 1000 | 1110 | 1101 | 1100 | 0000 | 0001 | 0010 | 0011 |
| SGC Format No. | 3 | 0 | 1 | 2 | 3 | 0 | 1 | 2 | 3 | 0 | 1 | 2 | 3 |

FIG. 10B

High-order 12-bit (bits 7 to 18) codes of cylinder numbers

| Decimal | Binary | | | Graycode | | | 503 | | | | | | | | | |
|---|---|---|---|---|---|---|---|---|---|---|---|---|---|---|---|---|
| 4088 | 0000 | 1111 | 1000 | 0000 | 1000 | 1100 | 0000 | 0000 | 1010 | 1111 | 1000 | 0000 | 0000 | 1001 | 1010 | 1111 |
| 4089 | 0000 | 1111 | 1001 | 0000 | 1000 | 1101 | 0001 | 0000 | 1010 | 1110 | 1000 | 0000 | 0000 | 1001 | 1010 | 1110 |
| 4090 | 0000 | 1111 | 1010 | 0000 | 1000 | 1111 | 0011 | 0000 | 1010 | 1100 | 1000 | 0000 | 0000 | 1001 | 1010 | 1100 |
| 4091 | 0000 | 1111 | 1011 | 0000 | 1000 | 1110 | 0010 | 0000 | 1010 | 1101 | 1000 | 0000 | 0000 | 1001 | 1010 | 1101 |
| 4092 | 0000 | 1111 | 1100 | 0000 | 1000 | 1010 | 0110 | 0000 | 1010 | 1001 | 1000 | 0000 | 0000 | 1001 | 1010 | 1001 |
| 4093 | 0000 | 1111 | 1101 | 0000 | 1000 | 1011 | 0111 | 0000 | 1010 | 1000 | 1000 | 0000 | 0000 | 1001 | 1010 | 1000 |
| 4094 | 0000 | 1111 | 1110 | 0000 | 1000 | 1001 | 0101 | 0000 | 1010 | 1010 | 1000 | 0000 | 0000 | 1001 | 1010 | 1010 |
| 4095 | 0000 | 1111 | 1111 | 0000 | 1000 | 1000 | 0100 | 0000 | 1010 | 1011 | 1000 | 0000 | 0000 | 1001 | 1010 | 1011 |
| | 500 | | | 501 | | | 502 | | | | | | | | | |

F I G. 11

|  | DH of second sector ||||| 
|---|---|---|---|---|---|
|  | 0 | 1 | 2 | 3 | 4 |
| DH of first sector  0 | × | × | × | × | × |
| 1 | × | × | × | ○ | ○ |
| 2 | × | × | × | ○ | ○ |
| 3 | × | × | × | × | × |
| 4 | × | × | × | × | × |

METHOD FOR GENERATING ADDRESS DATA AND DISK STORAGE APPARATUS

CROSS-REFERENCE TO RELATED APPLICATIONS

This application claims the benefit of U.S. Provisional Application No. 61/864,831, filed Aug. 12, 2013, the entire contents of which are incorporated herein by reference.

FIELD

Embodiments described herein relate generally to a method for generating address data and a disk storage apparatus.

BACKGROUND

Nowadays, increase in recording density of disks serving as storage media are promoted, in a field of disk storage apparatuses such as hard disk drives (hereinafter simply referred to as a "disk drive"). In a disk drive, a number of cylinders (tracks) including servo areas (hereinafter referred to as "servo sectors"), on which servo information are recorded, are arranged radially on the disk. The servo information is positional information used to detect a position of the head on the disk, and includes address data including a cylinder number and a servo sector number.

In the meantime, a method for dividing servo information has been proposed to increase the recording density of disks. In the method, a cylinder code forming a cylinder number to identify a cylinder is divided and recorded among a plurality of servo sectors in the cylinder. Although the method reduces the size of each servo sector, the size of each servo sector can be more effectively reduced, by reducing an area for recording the servo sector number, as well as the cylinder number.

DETAILED DESCRIPTION

In general, according to one embodiment, there is provided a method for generating address data in a disk drive. The method generates a first code corresponding to a cylinder number. The cylinder number is divided and recorded on a plurality of servo sectors in association with an identification of a cylinder on a disk. The first code is formed of some codes obtained by dividing the cylinder number based on a number of each of the servo sectors. The method generates a second code corresponding to address data for each of the servo sectors, by encoding the first code based on the servo sector number and a servo format number. The servo format number is used to identify a format of each of the servo sectors.

Various embodiments will be explained hereinafter with reference to drawings.

[Configuration of Disk Drive]

Figure 1:
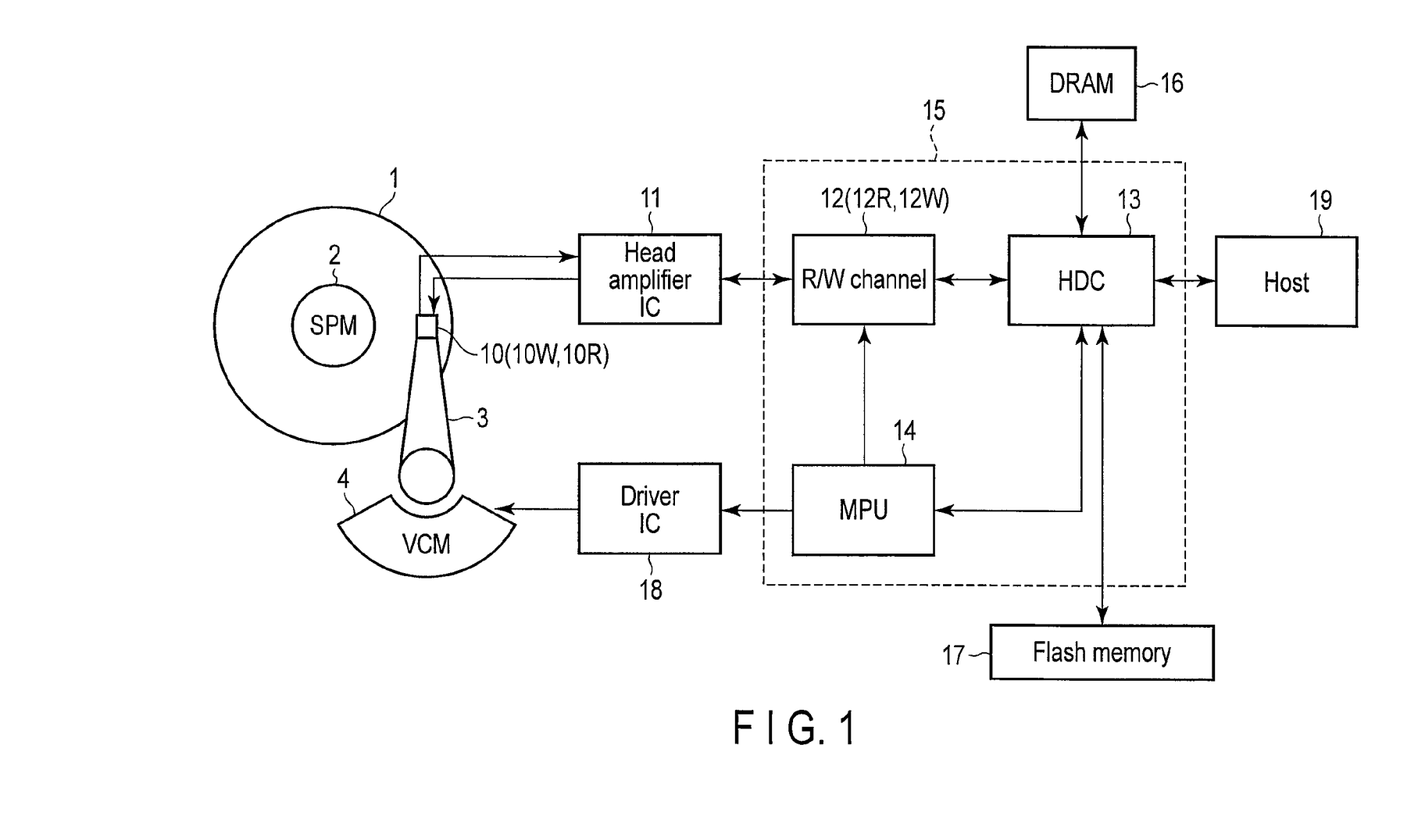
FIG. 1 is a block diagram showing a configuration of a disk drive according to embodiments.

FIG. 1 is a block diagram showing a main part of a disk drive according to first and second embodiments.

As shown in FIG. 1, the disk drive comprises a head-disk assembly (HDA), a head amplifier integrated circuit (hereinafter referred to as a "head amplifier IC") 11, a controller 15, and a driver IC 18.

The HDA includes a disk 1 serving as a storage medium, a spindle motor (SPM) 2, an arm 3 provided with a head 10, and a voice coil motor (VCM) 4. The disk 1 is rotated by a spindle motor 2. The arm 3 and the VCM 4 form an actuator, and moves (seek) the head 10 to a target position on the disk 1. Specifically, the actuator moves the head 10 mounted on the arm 3 radially over the disk 1, by driving of the VCM 4. The VCM 4 is driven and controlled by a drive current provided from the driver IC 18.

The disk 1 includes a number of cylinders (tracks), on which data is recorded. The head 10 includes a slider as a main body, and includes a write head 10W and a read head 10R mounted on the slider. The read head 10R reads data recorded on a cylinder on the disk 1. The read data is servo information and user data described below. The write head 10W writes user data to the disk 1.

The head amplifier IC 11 includes a read amplifier and a write driver. The read amplifier amplifies a read signal read by the read head 10R, and transmits the amplified read signal to a read/write (R/W) channel 12. The write driver transmits a write current corresponding to write data output from the R/W channel 12 to the write head 10W.

The controller 15 is formed of a one-chip integrated circuit including the R/W channel 12, a hard disk controller (HDC) 13, and a microprocessor (MPU) 14. The R/W channel 12 includes a read channel 12R and a write channel 12W. The read channel 12R processes a read signal read by the read head 10R, and thereby decodes data (including servo information). The write channel 12W executes signal processing for write data from the HDC 13.

The HDC 13 controls data transmission between a host 19 and the R/W channel 12. The HDC 13 executes data transmission control, by controlling a buffer memory (DRAM) 16 and temporarily storing read data and write data in the buffer memory 16. The HDC 13 also controls a flash memory 17, and thus stores or reads a program to be executed by the MPU 14 or device parameters.

The MPU 14 also referred to as a microcontroller. The MPU 14 controls the VCM 4 via the driver IC 18, and thus executes positioning control (servo control) for the head 10. The MPU 14 also controls data recording and reading via the R/W channel 12.

First Embodiment

Figure 2A:
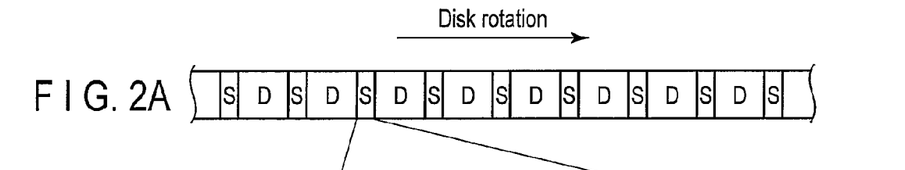
FIGS. 2A, 2B, and 2C are diagrams illustrating a servo format according to a first embodiment.

As shown in FIG. 2A, servo sectors (S) are embedded discretely at regular intervals to divide data areas (data sectors D), in each cylinder (track) formed on the disk 1. The servo sectors S are formed radially on the disk 1, although not shown. An area including a servo sector (S) and a data sector (D) is also referred to as a servo frame.

Figure 2B:
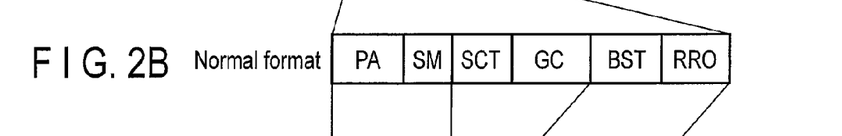

FIG. 2B shows a normal format (servo format) of a servo sector. As shown in FIG. 2B, a servo sector stores a preamble (PA), a sync mark (SM), a servo sector number (SCT), a cylinder number (Gray code [GC]), a servo burst pattern (BST), and repeatable runout correction data (RRO) in this order, circumferentially with respect to the disk 1. In the normal servo format, SCT and GC form an address data area.

Figure 2C:
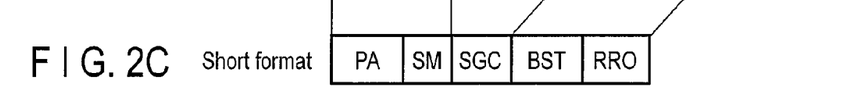

According to the present embodiment, a reduced short format is achieved in the servo format, as shown in FIG. 2C. Specifically, according to the present embodiment, an address data area is formed of a short Gray code (SGC) obtained by combining a servo sector number (SCT) and a cylinder number (GC). This structure shortens the address data area. The following is specific explanation of the present embodiment.

Figure 3A:
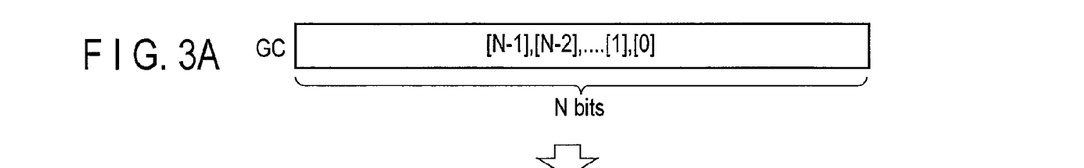
FIGS. 3A, 3B, and 3C are diagrams illustrating a short Gray code (SGC) format according to the first embodiment.
Figure 3B:
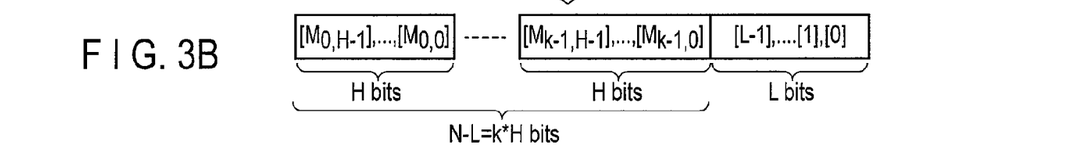
Figure 3C:
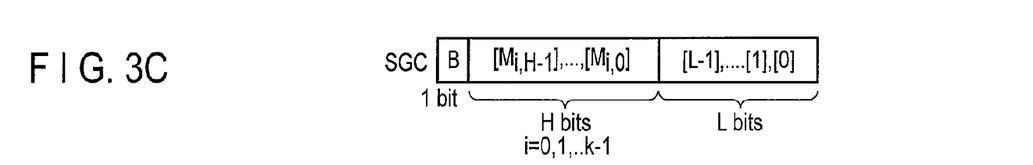

FIGS. 3A, 3B, and 3C show correspondence between a normal GC and an SGC of the present embodiment. As shown in FIG. 3A, GC is a cylinder number (cylinder code) formed of N bits. As shown in FIG. 3B, the N-L high-order bits obtained by excluding the L low-order bits from the GC of N bits are divided into k H-bit codes. Specifically, the present embodiment has a servo information division structure in which the cylinder code (GC) forming the cylinder number is divided among servo sectors (S) in the cylinder and recorded separately on the respective servo sectors.

FIG. 3C shows an SGC having a format obtained by combining the divided H high-order bits with the L low-order bits. The format of the SGC according to the present embodiment is also referred to as "SGC format". Specifically, as shown in FIG. 3C, k SGCs are generated from the GC of N bits in the present embodiment. An information bit B may be added to the head of each SGC format.

Figure 4:
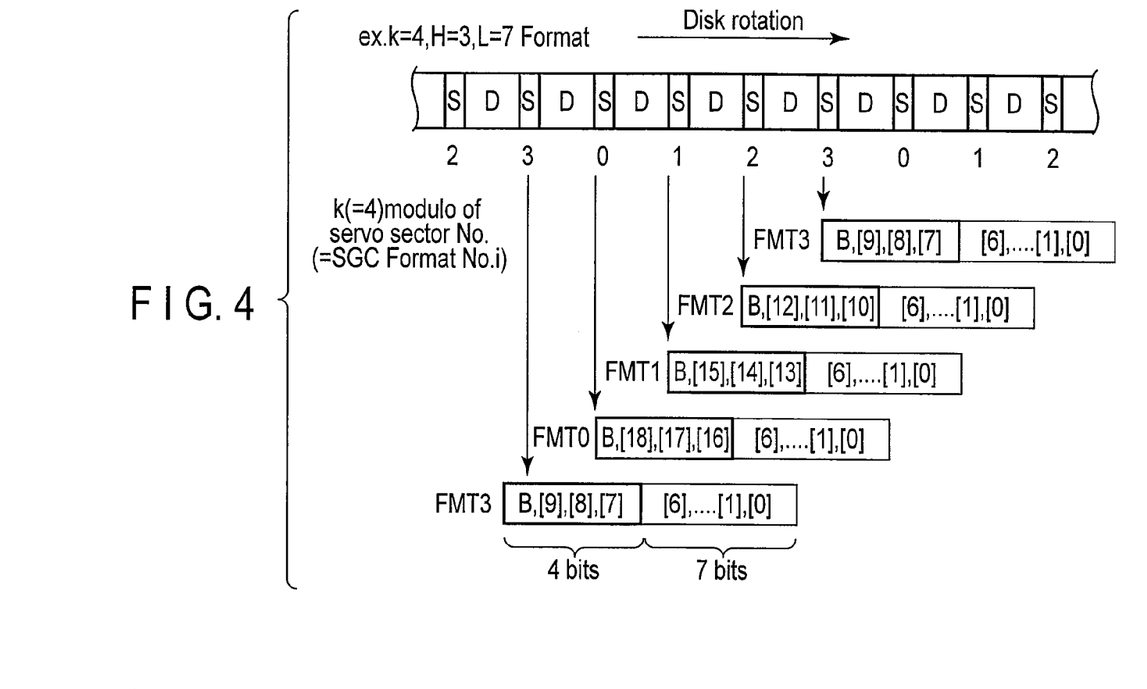
FIG. 4 is a diagram schematically showing the positional relationship of servo sectors, on which SGCs are recorded, according to the first embodiment.

FIG. 4 is a diagram showing the positional relationship between servo sectors, on each of which an SGC is recorded.

As a specific example, each of a plurality of generated SGCs is formed with an SGC format having parameters k=4, H=3, L=7. Each SGC format has an 11-bit format structure in which an information bit B of one bit is added to the 3 high-order bits and 7 low-order bits. An SGC of an SGC format number (FMT0 to 3) corresponding to the residue modulo 4 of servo sector No. is assigned to each servo sector (S).

The controller 15 of the disk drive shown in FIG. 1 decodes an SGC read by the read head 10R from each servo sector (S) on the disk 1, and recognizes the current position (cylinder number) of the head 10. To decode the SGC by the controller 15, it is required in the present embodiment that bits to identify the four SGC formats (FMT0 to 3), that is, at least 2 low-order bits of the servo sector number are known.

According to the present embodiment, the 2 low-order bits of the servo sector number are convoluted and recorded on the SGC. Thus, the controller 15 decodes the cylinder number by determining the SGC format number (FMT0 to 3) based on the 2 low-order bits of the servo sector number included in the SGC. As shown in FIG. 2C, no address data area only for the servo sector number (SCT) is required in the present embodiment. In addition, the high-order bits of the servo sector number (SCT) may be omitted or recorded on a dedicated area adjacent to the SGC.

Figure 5A:
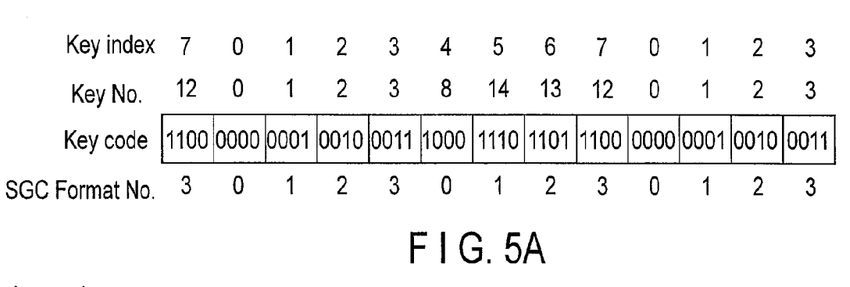
FIGS. 5A and 5B are diagrams illustrating a convolution method for SGC format numbers according to the first embodiment.
Figure 5B:
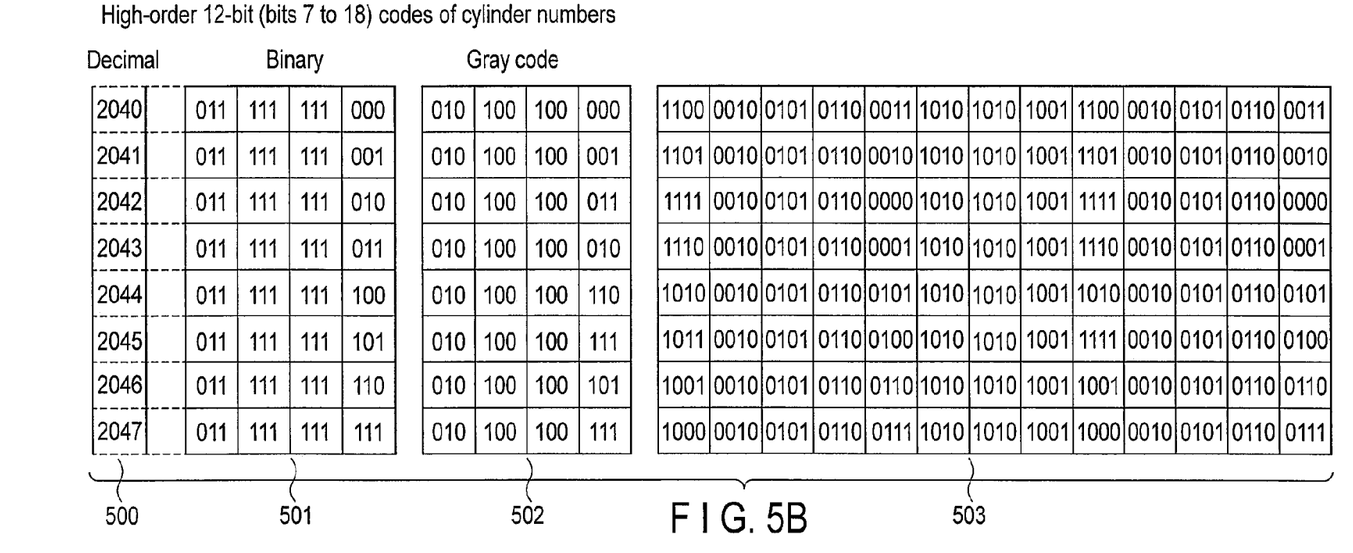

FIGS. 5A and 5B are diagrams illustrating a convolution method for the SGC format numbers.

First, according to the present embodiment, a cylinder number is formed of a format of a 19-bit code, as a specific example. In FIG. 5B, the low-order 7-bit (L) codes are omitted for convenience' sake, and only the high-order 12-bit (k×H) codes are shown. The cylinder area numbers 500 denoted by decimal numbers (Decimal) are 2040 to 2047, with the 7 low-order bits omitted, in a range in which the cylinder numbers are $2040 \times 2^7$ to $2047 \times 2^7$, and cylinder numbers denoted by binary numbers (Binary) corresponding to them are high-order cylinder codes 501. High-order cylinder codes 502 are Gray codes corresponding to the cylinder area numbers 2040 to 2047. High-order cylinder codes 503 are 4-bit codes being high-order bits of SGCs and being actually recorded on respective servo sectors (S) on the disk 1.

FIG. 5A shows key codes (KEYCODE) corresponding to the SGC format numbers 0 to 3 (FMT0 to 3). The key codes are codes used in convolution to generate the high-order bit (4-bit) codes 503 of the SGCs. Key indexes (KEY INDEX) are the 3 low-order bits of the servo sector numbers. The 3 low-order bits of the key codes change as <0, 1, 2, 3, 0, 6, 5, 4>, in response to change of the key indexes as <0, 1, 2, 3, 4, 5, 6, 7> (change of the 2 low-order bits of the servo sector number as <0, 1, 2, 3, 0, 1, 2, 3>).

When a Hamming distance between the key code and the key code located 4 servo sectors before the key code is obtained, the key indexes 0 and 4 can be distinguished from the other servo sectors by a sufficient Hamming distance (=3), since the value <0, 3, 3, 3, 0, 3, 3, 3> is obtained. In addition, it is possible to distinguish the key index 0 from the key index 4, using a 4-bit key code string <0, 1, 2, 3, 8, 14, 13, 12> generated by adding the information bit B to the most significant bit position of each of the 3-bit key codes.

In the present embodiment, each of the cylinder codes 502 which are the 12 high-order bits of the Gray code, is divided into 4 blocks each having 3 bits. These 4 blocks are convoluted into respective servo sectors having servo sector numbers in which the residues modulo 8 thereof are 0, 1, 2, and 3 (that is, servo sectors having key indexes 0, 1, 2, and 3), in an order beginning with the high-order block. The 4 blocks are also convoluted into respective servo sectors having servo sector numbers in which the residues modulo 8 thereof are 4, 5, 6, and 7 (that is, servo sectors having key indexes 4, 5, 6, and 7), in an order beginning with the high-order block. Specifically, an exclusive OR (XOR) operation between the 3 bits of the Gray code with the 4-bit key codes corresponding to the SGC format numbers 0 to 3 is executed, and thereby each SGC format number is convoluted. Thereby, high-order 4-bit codes 503 of the SGCs corresponding to the SGC format numbers 0 to 3 (FMT0 to 3) are generated. Actually, SGCs, each of which includes an 11-bit code formed of the generated high-order 4-bit code 503 and the omitted low-order 7-bit code, are recorded on respective servo sectors (S) on the disk 1.

As a specific example, in the case where the cylinder area number 500 is 2040, an XOR operation is performed with the high-order block (010) of the Gray code 502 and the key code (0000) of the SGC format number 0, and thereby the high-order 4-bit code (0010) of the SGC 503 is generated. In the same manner, an XOR operation is performed with the next block (100) of the Gray code 502 and the key code (0001) of the SGC format number 1, and thereby the high-order 4-bit code (0101) of the SGC 503 is generated. Then, an XOR operation is performed with the next block (100) and the key code (0010) of the SGC format number 2, and thereby the high-order 4-bit code (0110) of the SGC 503 is generated. An XOR operation is performed with the last block (000) and the key code (0011) of the SGC format number 3, and thereby the high-order 4-bit code (0011) of the SGC 503 is generated.

The SGCs generated as described above and each including the 4 high-order bits and the 7 low-order bits are written to respective servo sectors on the disk 1, in a servo writing step (step of writing servo information) included in the process of manufacturing the disk drive.

Figure 6A:
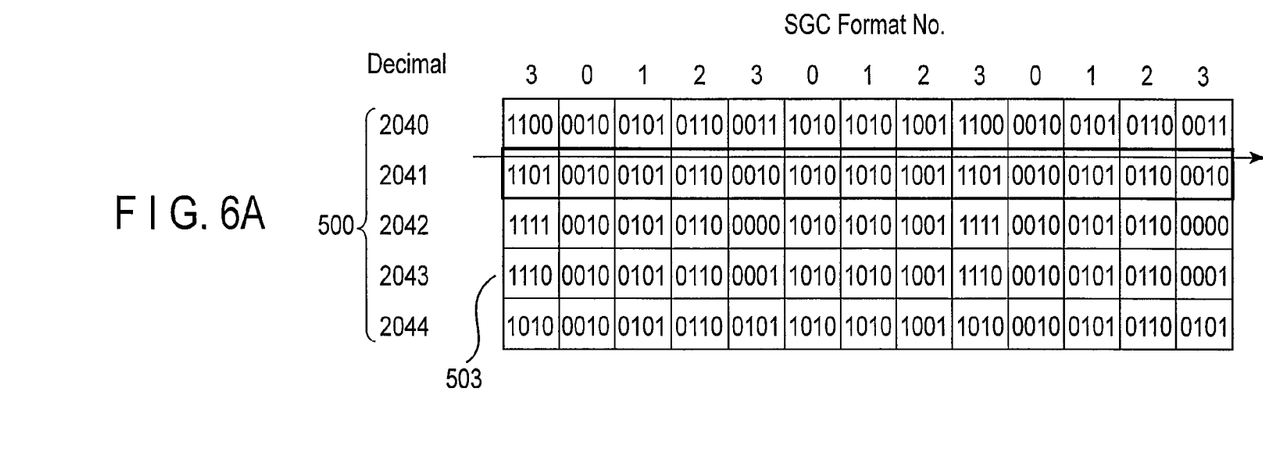
FIGS. 6A and 6B are diagrams illustrating an example of a method for determining SGC format numbers according to the first embodiment.
Figure 6B:
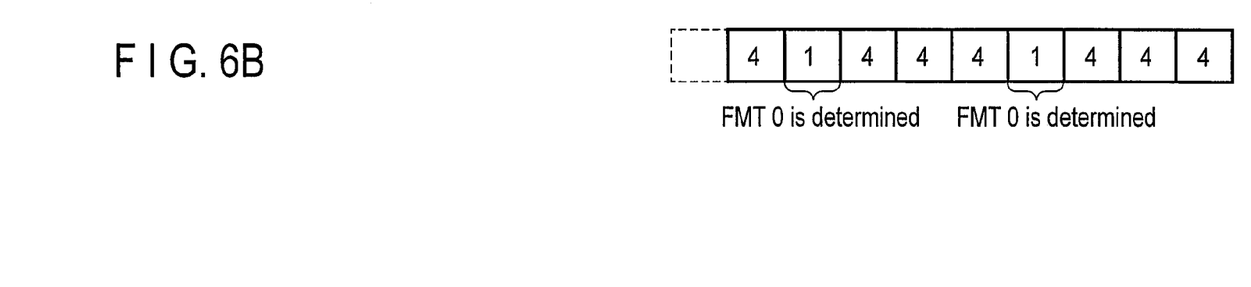

FIGS. 6A and 6B are diagrams illustrating a method for determining the SGC format numbers.

FIG. 6A shows 4-bit codes 503, which correspond to the cylinder area numbers 500 and are high-order bits of SGCs recorded on respective servo sectors (S) on the disk 1, as described above. The servo sectors (S) are identified based on the SGC format numbers 0 to 3 (FMT0 to 3). FIG. 6B shows Hamming distances (DH) from a code located 4 servo sectors before the present code.

In the disk drive, when the read head 10R scans a range of an equal cylinder area number (for 7 low-order bits, that is, a range for 128 cylinders) on the disk 1, the 4 high-order bits of the SGC read by the controller 15 are a series of 4-bit codes which are repeated every 8 servo sectors. An arrow in FIG. 6A indicates a direction in which the read head 10R scans a range having the cylinder area number of 2041.

Based on the calculation of the Hamming distance DH of the 4 high-order bits of the SGC from a code located 4 servo sectors before the present code, servo sectors having the SGC format number FMT0, in which the DH of the key code is 1, are detected. In the other servo sectors, DH is 4. Thus, when servo sectors having the DH of 1 are detected, it can be determined that the servo sectors have an SGC format number of FMT0. In addition, servo sectors following the servo sector having the SGC format number of FMT0 are successively determined as having SGC format numbers of FMT 1, 2, and 3.

Figure 7A:
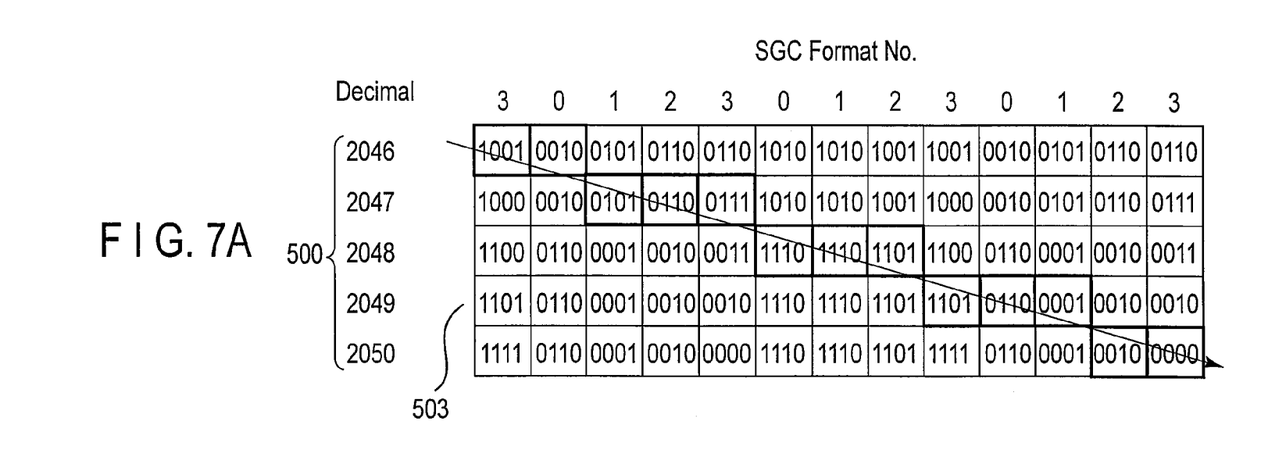
FIGS. 7A and 7B are diagrams illustrating another example of the method for determining SGC format numbers according to the first embodiment.
Figure 7B:
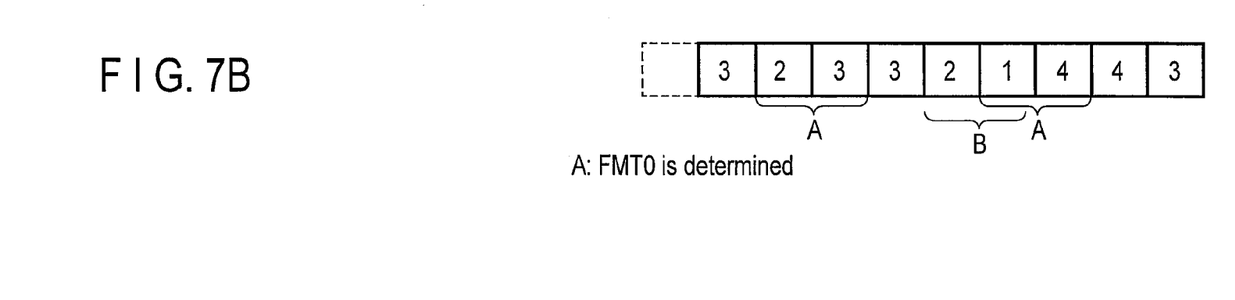

FIGS. 7A and 7B are diagrams illustrating a method for determining the SGC format numbers, in the case where the head 10 performs seek operation at at least certain speed radially over the disk 1.

An arrow in FIG. 7A indicates the case where the head scans an area of cylinder area numbers 2046 to 2050 while the disk 1 is rotated by 13 servo sectors.

In this case, when attention is paid to the 4 high-order bits 503 of the SGC having SGC format number 0, their values are changed at the boundary between the cylinder area numbers 2047 and 2048. In such a case, for example, when the head passes through the cylinder area number 2046 first, the head reads a 4-bit code 0010 corresponding to the SGC format number 0 scanned by the head. Next, when the head is still passing through the same cylinder area number 2046, the head read a 4-bit code 1010 corresponding to the SGC format number 0 scanned by the head. In this case, the Hamming distance DH is 1. In comparison with this, when the head moves obliquely in seek operation or the like and passes through the cylinder area number 2048 as shown in FIG. 7B, the head reads a 4-bit code 1110 corresponding to the SGC format number 0. Thus, the Hamming distance DH is 2.

As described above, when the head moves obliquely at a wide angle in seek operation as shown in FIG. 7B, the SGCs read by the controller 15 are not always repeated every 8 servo sectors. Specifically, a series of Hamming distances DH are not <1, 4, 4, 4, 1, 4, 4, 4>.

However, since the cylinder codes of the 4 high-order bits recorded with the SGC format numbers FMT0 and FMG1 are high-order bits 13 to 18 of a 19-bit cylinder number, it can be regarded that the Hamming distances change little, in view of the number of cylinders which the head 10 can run across in seek operation while the disk 1 is rotated by 4 servo sectors. In this case, the change amount is 1 bit at the maximum in the Gray code. Specifically, the Hamming distance DH in the SGC format number FMT0 is 1 or 2, and the Hamming distance DH in the SGC format number FMT1 is 3 or 4. Thus, as shown in FIG. 7B, a combination of Hamming distances DH in servo sectors of the SGC format numbers FMT0 and 1 is one of (1, 3), (1, 4), (2, 3), and (2, 4) (Pattern A).

On the other hand, since the cylinder number recorded on the servo sector of the SGC format number FMT3 is bits 7 to 9, when the crossing speed of the head 10 reaches a certain speed or more, the Hamming distance DH may be 1 or 2. Thus, when it is singly determined, it may be erroneously determined as SGM format number FMT0. However, in this case, since the Hamming distance DH of the following SGC format number FMT0 is 1 or 2, the Hamming distances do not meet the above condition as shown in FIG. 7B (Pattern B). Thus, the SGC format numbers FMT can be determined, by observing the Hamming distances DH for two successive servo sectors.

Figure 8:
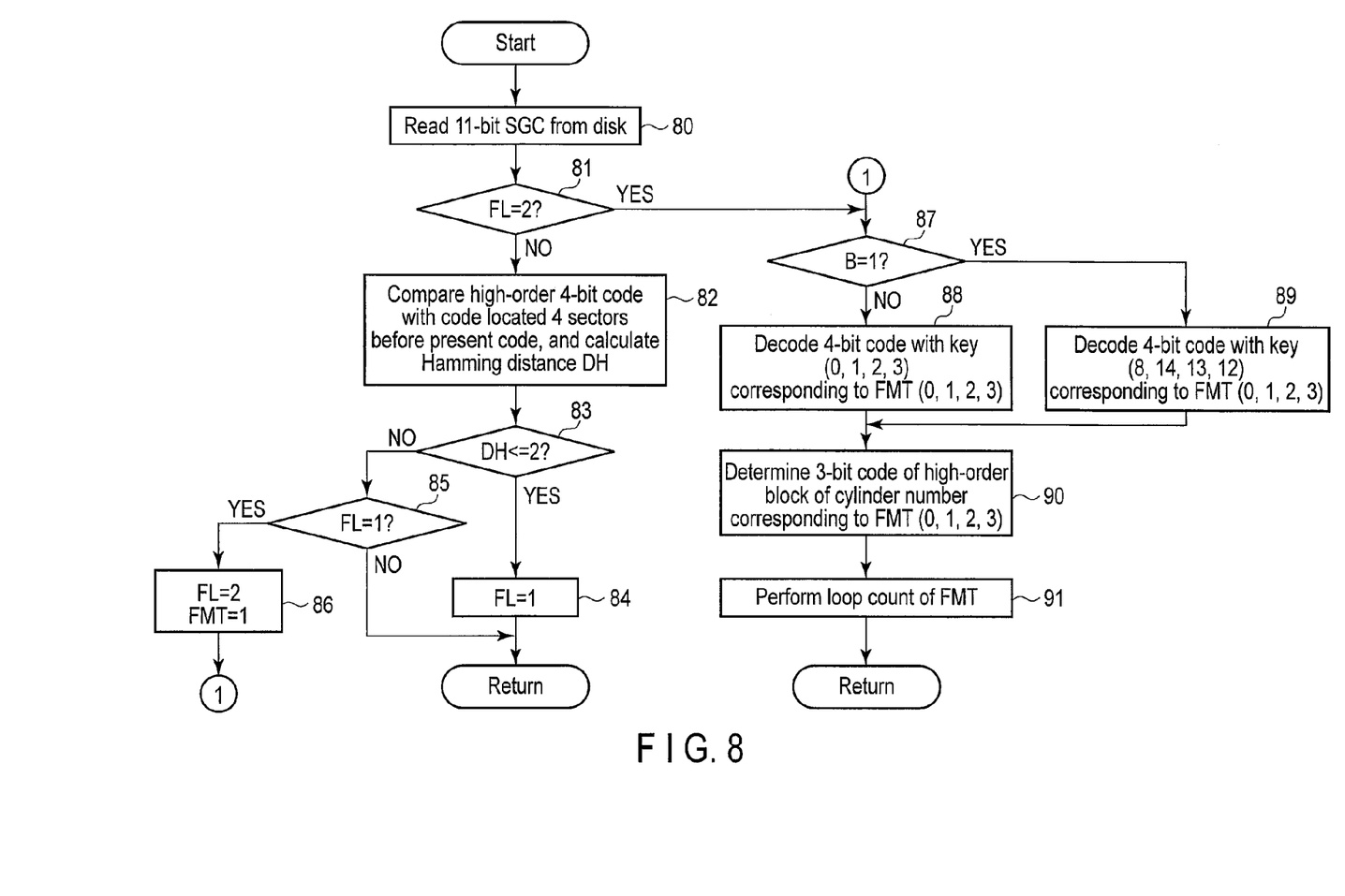
FIG. 8 is a flowchart illustrating SGC decoding processing according to the first embodiment.

FIG. 8 is a flowchart illustrating SGC decoding processing according to the present embodiment.

As described above, the controller 15 decodes a SGC read by the read head 10R from a servo sector (S) on the disk 1, and recognizes the current position (cylinder number) of the head 10. In the present embodiment, the controller 15 determines the SGC format number (FMT0 to 3) in order to determine which of the four SGC formats (FMT0 to 3) the read SGC has. The following is specific explanation thereof with reference to the flowchart of FIG. 8.

First, the controller 15 reads an 11-bit SGC from the disk 1 (Block 80). The controller 15 refers to a FMT determination flag FL, and determine whether processing of determining the SGC format number has been finished or not (Block 81). The flag FL having a value of 2 indicates that the determination processing has been finished and the SGC format number FMT has been determined. Thus, when the flag FL is 2, the controller 15 goes to SGC decoding processing (YES of Block 81).

On the other hand, when the flag FL is not 2, the controller 15 continues processing of determining the SGC format number FMT (NO of Block 81). In the FMT determination processing, the controller 15 compares the high-order 4-bit code of the SGC with the code located 4 servo sectors before the present code, and thus calculates the hamming distance DH (Block 82). The controller 15 determines whether the Hamming distance DH is 2 or less (DH is 1 or 2) (Block 83).

When the distance DH is 2 or less, the controller 15 temporarily sets the FMT determination flag FL to 1, and goes to decoding processing for the next servo sector as an FMT temporary determination state (Block 84). When the DH exceeds 2 (DH is 3 or 4), the controller 15 determines whether the flag FL is 1 or not (Block 85). When the flag FL is not 1 (that is, FL=0), the controller 15 goes to decoding processing for the next servo sector (NO of Block 85).

When the flag FL is 1, the controller 15 goes to FMT determination processing (YES of Block 85). Specifically, in the FMT determination processing, the flag FL is set to 2, the SGC format number FMT is initialized to 1, and then the controller 15 goes to SGC decoding processing (Block 86).

In the SGC decoding processing, the controller 15 determines whether the most significant bit B of the SGC is 1 or not (Block 87). Specifically, the controller 15 executes processing of selecting a key code pattern based on the value of the SGC most significant bit B, in addition to the value of the SGC format number FMT.

Specifically, as shown in FIG. 5A, when the SGC most significant bit B is 0, the controller 15 selects a key code (4 bits) of the key number (0 to 3) corresponding to the SGC format number FMT (0 to 3) (NO of Block 87). The controller 15 decodes the high-order 4-bit code of the 11-bit SGC by an XOR operation, using the selected key code (Block 88). On the other hand, when the SGC most significant bit B is 1, the controller selects a key code (4 bits) of the key number (8, 14, 13, 12) corresponding to the SGC format number FMT (0, 1, 2, 3) (YES of Block 87). The controller 15 decodes the high-order 4-bit codes of the 11-bit SGC by an XOR operation, using the selected key code (Block 89).

The controller 15 determines a 3-bit code of the high-order block of the cylinder number corresponding to the determined servo format number FMT (0 to 3) (Block 90). The controller 15 performs increment processing for the servo format number FMT as a counter to loop with values of <0, 1, 2, 3>, and goes to decoding processing for the next servo sector (Block 91).

As described above, according to the present embodiment, high-order bit codes of the cylinder number are distributed and arranged in every k (for example, k=4) servo sectors, and each of the distributed high-order bit codes is convoluted with a low-order bit code of the servo sector number. Thereby, address data for a short Gray code (SGC) can be generated. The low-order bit code of the servo sector number functions as servo format number information (for example, FMT0 to 3) used to identify k SGC servo formats distributed among k servo sectors.

Thus, according to the method, implemented in the present embodiment, for generating address data, a normal servo format including an address data area formed of a servo sector number (SCT) and a cylinder number (GC) can be changed to a servo format including an address data area formed of an SGC, as shown in FIGS. 2B and 2C. Thereby, according to the present embodiment, the address data area of each servo sector is reduced in size, and thus a data area (data sector D) for recording user data in each cylinder (track) can be increased.

Second Embodiment

FIGS. 9, 10A, 10B, and 11 are diagrams illustrating a method for generating address data according to a second embodiment. The following is specific explanation of the second embodiment.

Figure 9:
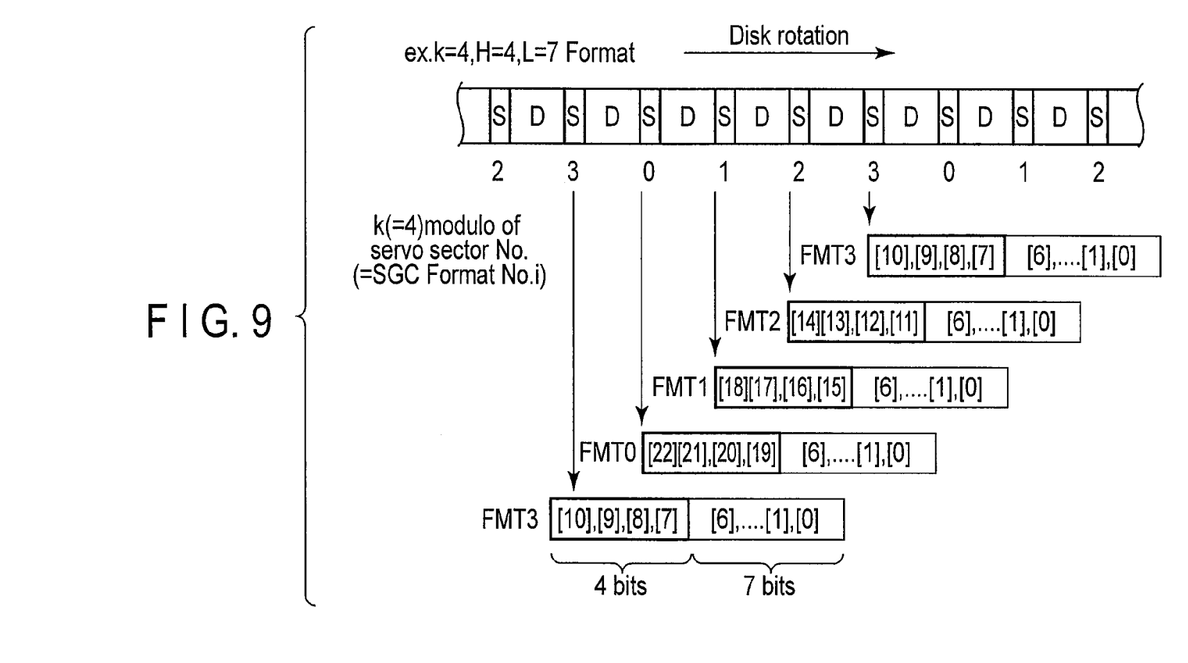
FIG. 9 is a diagram schematically showing the positional relationship of servo sectors, on which SGCs are recorded, according to a second embodiment.

FIG. 9 is a diagram illustrating the positional relationship of servo sectors (S), on each of which an SGC is recorded, according to the present embodiment. In a specific example of the present embodiment, generated k SGCs are formed of SGC formats with parameters of k=4, H=4, and L=7. Specifically, each SGC format is an 11-bit format formed of 4 high-order bits and 7 low-order bits. In the same manner as the first embodiment, SGCs of SGC format numbers (FMT0 to 3) corresponding to the residue modulo 4 of servo sector No. are assigned to respective servo sectors (S). Specifically, also in the present embodiment, the 2 low-order bits of the servo sector number are convoluted into an SGC and recorded on the SGC. The controller decodes the cylinder number, by determining the SGC format number (FMT0 to 3) based on the 2 low-order bits of the servo sector number included in the SGC.

Figure 10A:
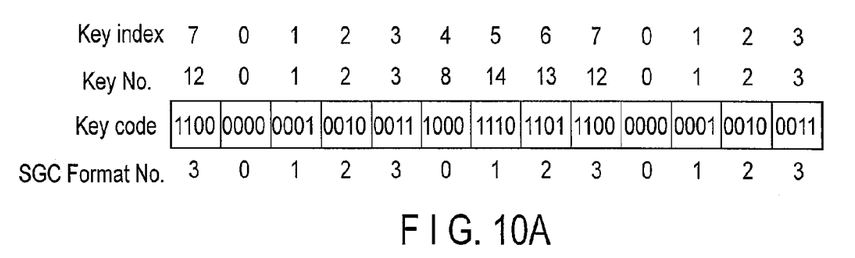
FIGS. 10A and 10B are diagrams illustrating a convolution method for SGC format numbers according to the second embodiment.
Figure 10B:
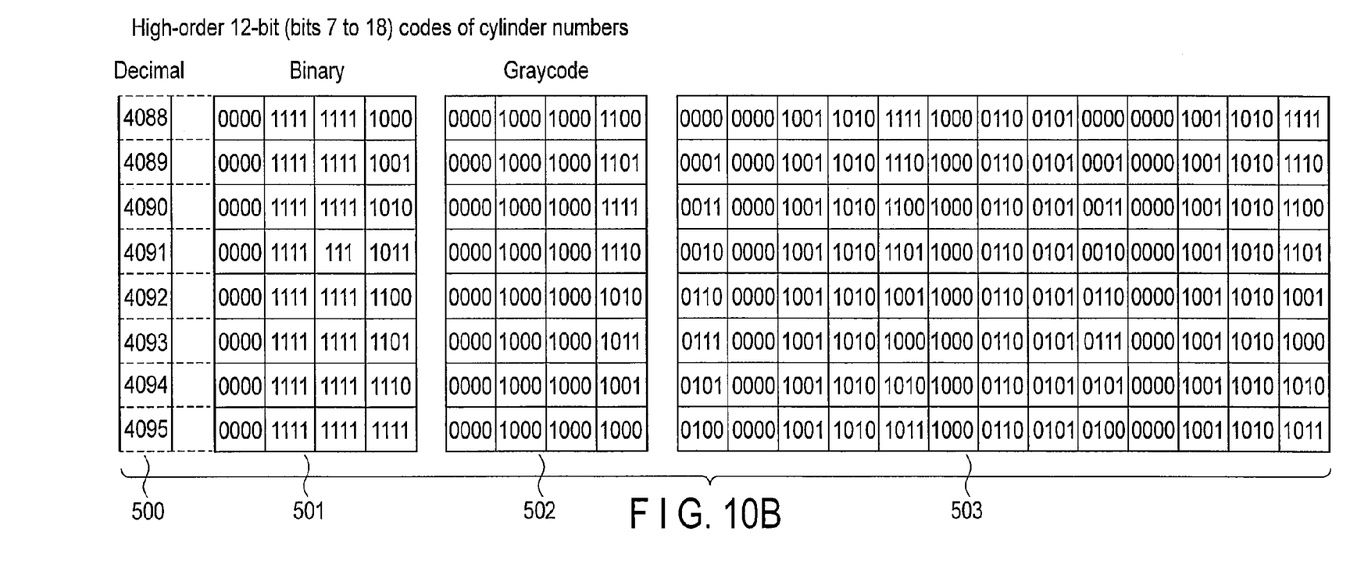

FIGS. 10A and 10B are diagrams illustrating a convolution method for the SGC format numbers according to the present embodiment.

As shown in FIG. 10B, as a specific example of the present embodiment, a cylinder number is formed of a format of a 23-bit code. In FIG. 10B, low-order 7-bit (L) codes are omitted for convenience' sake, and only high-order 16-bit (k×H) codes are shown. Cylinder area numbers 500 denoted by decimal numbers are 4088 to 4095 obtained by omitting 7 low-order bits, in a range in which cylinder numbers are $4088 \times 2^7$ to $4095 \times 2^7$. Cylinder numbers corresponding to the cylinder area numbers 500 and denoted by binary numbers are high-order cylinder codes 501. High-order cylinder codes 502 are Gray codes corresponding to the cylinder area numbers 4088 to 4095. High-order cylinder codes 503 are 4-bit codes being high-order bits of SGCs and being actually recorded on respective servo sectors (S) on the disk 1.

FIG. 10A shows key indexes (KEY INDEX), key numbers (KEY NO.), and key codes (KEYCODES). These are the same as those of the first embodiment detailed above with reference to FIG. 5A. However, according to the present embodiment, each cylinder code 502 being a Gray code of the 16 high-order bits is divided into 4-bit blocks. Thus, in the present invention, a 4-bit key code is associated with a 4-bit code of each block. Specifically, an XOR operation is executed between a 4-bit code of each block with a 4-bit key code corresponding to the SGC format number 0 to 3, and thereby the SGC format number is convoluted.

As a specific example of the present embodiment, in the case where the decimal-number cylinder number 500 is 4088, a high-order 4-bit code (0000) of the SGC 503 is generated by an XOR operation with the high-order block (0000) of the Gray code 502 and the key code (0000) of the SGC format number 0. In the same manner, a high-order 4-bit code (1001) of the SGC 503 is generated by an XOR operation with the next block (1000) of the Gray code 502 and the key code (0001) of the SGC format number 1. Then, a high-order 4-bit code (1010) of the SGC 503 is generated by an XOR operation with the next block (1000) of the Gray code 502 and the key code (0010) of the SGC format number 2. A high-order 4-bit code (1111) of the SGC 503 is generated by an XOR operation with the last block (1100) of the Gray code 502 and the key code (0011) of the SGC format number 3.

Figure 11:
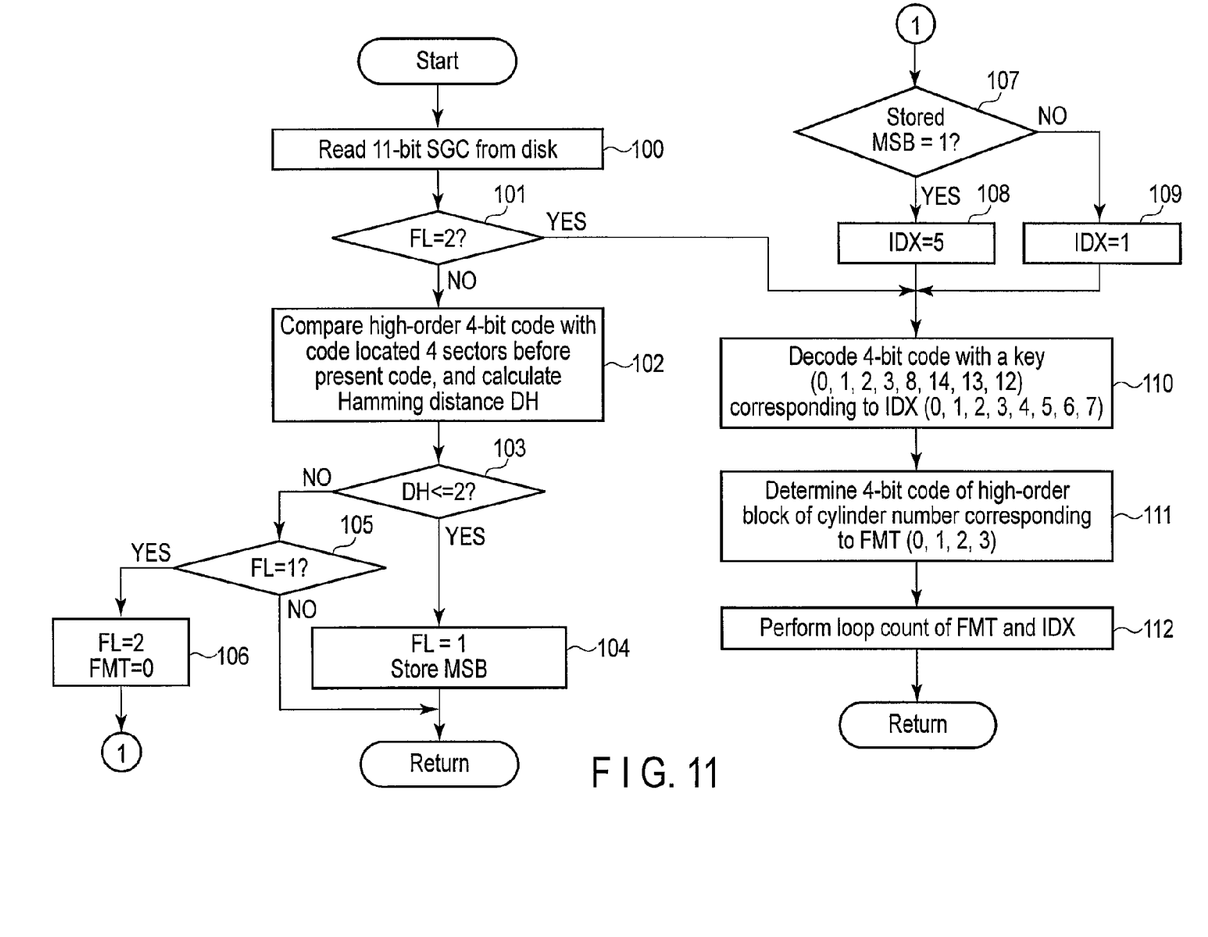
FIG. 11 is a flowchart illustrating SGC decoding processing according to the second embodiment.

FIG. 11 is a flowchart illustrating SGC decoding processing according to the present embodiment.

The present embodiment is the same as the case of the first embodiment explained with reference to FIG. 8, with respect to SGC format number determination processing shown in Blocks 100 to 106. However, in FMT temporary determination processing (Block 104) of the present embodiment, the flag FL is set to 1, and the value of the most significant bit is stored. When the FMT is determined, the stored value of the most significant bit is a value obtained by multiplying a most significant bit (always 0 when the maximum number of cylinders is less than $2^{22}$) of the 23-bit cylinder number by a key code of 0 or 8. Thus, the key index (IDX) is determined as 0 when the stored value of the most significant bit is 0, and the IDX is determined as 4 when the IDX is determined as 4 when the stored value of the most significant bit is 1.

In SGC decoding processing, the controller 15 determines whether the stored value of the most significant bit is 1 or not (Block 107). If the most significant bit is 0 (NO of Block 107), IDX is determined as 1 (Block 109). On the other hand, if the most significant bit is 1 (YES of Block 107), IDX is determined as 5 (Block 108).

The controller 15 obtains a 4-bit key code (key number 0, 1, 2, 3, 8, 14, 13, 12) corresponding to the determined IDX (0 to 7), and decodes the high-order 4-bit code of the SGC by an XOR operation using the key code (Block 110). The controller 15 determines the 4-bit code of the high-order block of the cylinder number corresponding to the determined servo format number FMT (0 to 3) (Block 111). The controller 15 executes increment processing as a counter to loop the servo format number FMT with a value of 0 to 3 and as another counter to loop the IDX with the value of 0 to 7, and goes to decoding processing for the next servo sector (Block 112).

As described above, according to the method for generating address data applied in the present embodiment, a normal servo format including an address data area formed of a servo sector number (SCT) and a cylinder number (GC) can be changed to a servo format including an address data area formed of an SGC, in the same manner as the first embodiment. Thereby, according to the present embodiment, the address data area of each servo sector is reduced in size, and thus data areas (data sectors D) for recording user data in each cylinder (track) can be increased.

Other embodiments can be achieved by the same constituent elements of the above embodiments, when the following conditions are satisfied.

Figure 12:
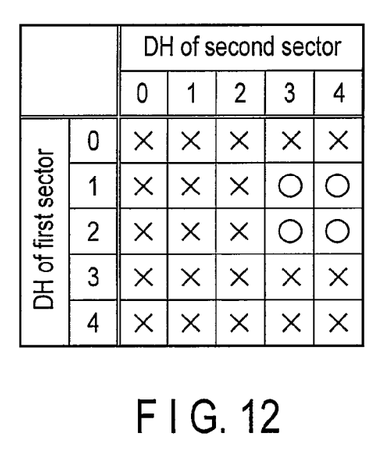
FIG. 12 is a diagram showing an example of a method for determining SGC format numbers according to the embodiments.

It is a necessary condition of each embodiment that the Hamming distance DH of the high-order bits of the SGC from a detected value for a sector located k servo sectors before the present sector is 1 or 2 when the SGC format number is FMT0, and the Hamming distance DH is H−2 or H−1 when the SGC format number is FMT1. FIG. 12 is a table indicating whether the SGC of the first sector determined as FMT0, based on a combination of the DH of the first sector and the DH of the second sector, among Hamming distances DH of successive two servo sectors. The above condition is equal to the condition that the high-order bits of the SGC in each of the servo formats FMT0 and FMT1 do not change by a value greater than 1 bit, while the disk 1 is rotated by k servo sectors. The frequency of change of the high-order bits of the SGC depends on the speed at which the head 10 crosses cylinders. Since FMT1 more corresponds to the low-order cylinder number than FMT0, it is a necessary and sufficient condition that the speed is a speed with which the high-order bit change amount of the SGC having FMT1 is less than or equal to 1 bit while the head 10 crosses the cylinder.

In addition, the high-order bit codes of the cylinder numbers recorded on FMT1 changes every C1 ($C1=2^{L+(k-2) \times H}$) of cylinders in number. Thus, when kV<C1 between the number of cylinders, C1, which are crossed in k servo sectors and the maximum speed V in seek operation of the head 10, a Hamming distance DH1 from a detected value of a servo sector located k servo sectors before the present sector is H−2 or H−1. The unit of the maximum speed V is the number of cylinders which the head 10 crosses while the disk 1 is rotated by 1 servo sector. In short, in each of the embodiments, it is a condition that the relational expression $kV<2^{L+(k-2) \times H}$ is established between parameters for the number L of the low-order bits of the cylinder number, the number H of the high-order bits of the cylinder number, and the number k of the SGC formats and the maximum speed V in seek operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for generating address data in a disk drive, the method comprising:
    generating a first code corresponding to a cylinder number, the cylinder number being divided and recorded on a plurality of servo sectors in association with an identification of a cylinder on a disk, the first code being formed of some codes obtained by dividing the cylinder number based on a respective servo sector number of each of the servo sectors, the servo sectors being respectively assigned servo sector format numbers used to identify formats of the servo sectors; and
    generating a second code corresponding to address data for each of the servo sectors, by encoding the first code based on the respective servo sector number and a respective servo format number corresponding to each of the servo sectors.

2. The method of claim 1, wherein:
    the first code is formed of a high-order code having a number of bits obtained by the division based on the respective servo sector number, and a low-order code having a number of bits common to the respective servo sector number; and
    generating the second code comprises generating the second code by executing an exclusive OR operation between a third code corresponding to the respective servo format number and the first code.

3. The method of claim 2, wherein:
    the first code comprises a first Gray code; and
    the second code comprises a second Gray code.

4. The method of claim 1, wherein:
    the respective servo format number is generated based on a low-order code of the respective servo sector number corresponding to each of the servo sectors; and
    generating the second code comprises generating the second code by convoluting the first code with the respective servo format number.

5. The method of claim 1, further comprising:
    reading the second code by a head from each of the servo sectors recorded on the disk; and
    decoding the first code corresponding to the cylinder number from the second code, using a third code corresponding to the respective servo format number.

6. The method of claim 5, wherein decoding the first code comprises determining a servo format number based on a high-order code of the second code, the high-order code being obtained by the division based on the respective servo sector number.

7. A data storage apparatus comprising:
    a disk configured such that the second code generated by the method of claim 2 is recorded thereon, the second code corresponding to address data for each of servo sectors;
    a head configured to read data recorded on the disk; and
    a controller configured to readback the second code read by the head.

8. The data storage apparatus of claim 7, wherein the controller is configured to control to position the head on a target cylinder on the disk, based on the readback second code.

9. The data storage apparatus of claim 7, wherein the controller is configured to decode the first code corresponding to a target cylinder number, based on the second code.

10. The data storage apparatus of claim 9, wherein the controller is configured to decode the first code corresponding to the target cylinder number from the second code, using a third code corresponding to the respective servo format number.

11. A data storage apparatus comprising:

a disk configured such that a second code corresponding to a first code is recorded thereon, the first code corresponding to a cylinder number for identifying a cylinder on the disk, the cylinder number being divided and recorded on a plurality of servo sectors, the first code being formed of some codes based on the divided cylinder number and a respective servo sector number of each of the servo sectors, the servo sectors being assigned servo sector format numbers for identifying formats of the servo sectors, the second code corresponding to address data for each of the servo sectors, the second code being generated by encoding the first code based on the respective servo sector number and a respective servo format number corresponding to each of the servo sectors;

a head configured to read data recorded on the disk; and a controller configured to readback the second code read by the head.

12. The data storage apparatus of claim 11, wherein:

the first code is formed of a high-order code having a number of bits obtained by the division based on the respective servo sector number, and a low-order code having a number of bits common to the respective servo sector number; and the second code is generated by executing an exclusive OR operation between a third code corresponding to the respective servo format number and the first code.

13. The data storage apparatus of claim 11, wherein:

the first code comprises a first Gray code; and the second code comprises a second Gray code.

14. The data storage apparatus of claim 11, wherein:

the respective servo format number is generated based on a low-order code of the respective servo sector number corresponding to each of the servo sectors; and the second code is generated by convoluting the first code with the respective servo format number.

15. The data storage apparatus of claim 11, wherein the controller is configured to control to position the head on a target cylinder on the disk, based on the readback second code.

16. The data storage apparatus of claim 11, wherein the controller is configured to decode the first code corresponding to a target cylinder number, based on the second code.

17. The data storage apparatus of claim 16, wherein the controller is configured to decode the first code corresponding to the target cylinder number from the second code, using a third code corresponding to the respective servo format number.

* * * * *